US012325236B2

(12) United States Patent
Kato

(10) Patent No.: US 12,325,236 B2
(45) Date of Patent: Jun. 10, 2025

(54) SUBSTRATE FOR LIQUID EJECTION HEAD AND METHOD FOR MANUFACTURING SUBSTRATE FOR LIQUID EJECTION HEAD

(71) Applicant: CANON KABUSHIKI KAISHA, Tokyo (JP)

(72) Inventor: Masataka Kato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 168 days.

(21) Appl. No.: 18/188,575

(22) Filed: Mar. 23, 2023

(65) Prior Publication Data

US 2023/0311503 A1 Oct. 5, 2023

(30) Foreign Application Priority Data

Mar. 30, 2022 (JP) ................................ 2022-056368

(51) Int. Cl.
*B41J 2/14* (2006.01)
*B41J 2/16* (2006.01)

(52) U.S. Cl.
CPC ........... *B41J 2/14233* (2013.01); *B41J 2/161* (2013.01); *B41J 2/1626* (2013.01)

(58) Field of Classification Search
CPC ...... B41J 2/14233; B41J 2/161; B41J 2/1626; B41J 2/1628; B41J 2002/14475; B41J 2/1631
See application file for complete search history.

(56) References Cited

U.S. PATENT DOCUMENTS 8,206,998 B2 6/2012 Kato et al.
9,333,749 B2 5/2016 Kato et al.
2017/0246893 A1* 8/2017 Muto .................. B41J 2/04588
2021/0222019 A1 7/2021 Mizutaki et al.

FOREIGN PATENT DOCUMENTS

JP 2013-091272 A 5/2013
JP 2021-116309 A 8/2021

* cited by examiner

*Primary Examiner* — Justin Seo
(74) *Attorney, Agent, or Firm* — Venable LLP

(57) ABSTRACT

A substrate for use in a liquid ejection head has an ejection hole for ejecting a liquid from the inside to the outside of the substrate. A plurality of scallops periodically changing the diameter of an inner circumferential surface of the ejection hole in the penetration direction are formed on the inner circumferential surface. The substrate for a liquid ejection head is characterized in that a width in the penetration direction of a first scallop present on the outermost side among the plurality of scallops is narrower than a width in the penetration direction of a second scallop adjacent to the first scallop on the inward side, and a depth in a radial direction of the ejection hole of the first scallop is shallower than a depth in the radial direction of the ejection hole of the second scallop.

8 Claims, 7 Drawing Sheets

EXAMPLE 1

FIG. 3A CONVENTIONAL EXAMPLE
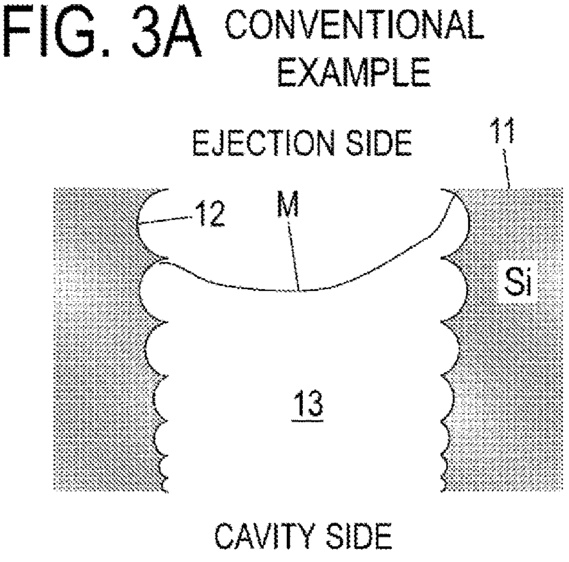
FIG. 3B EXAMPLE 1
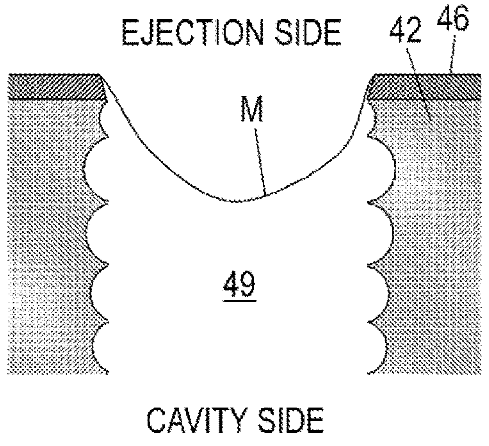
FIG. 3C EXAMPLE 2
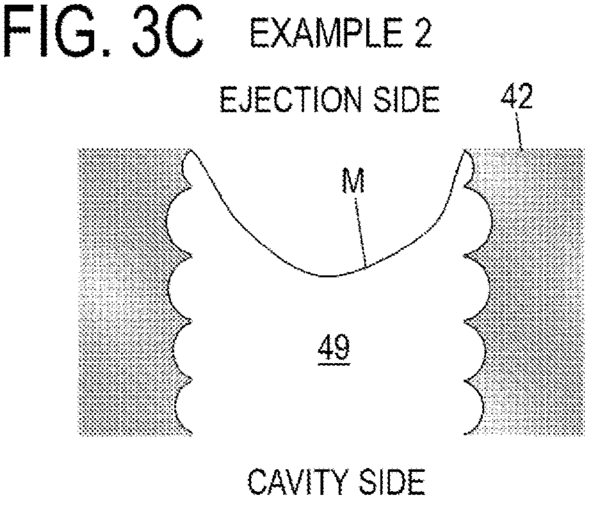

FIG. 7A EXAMPLE 1
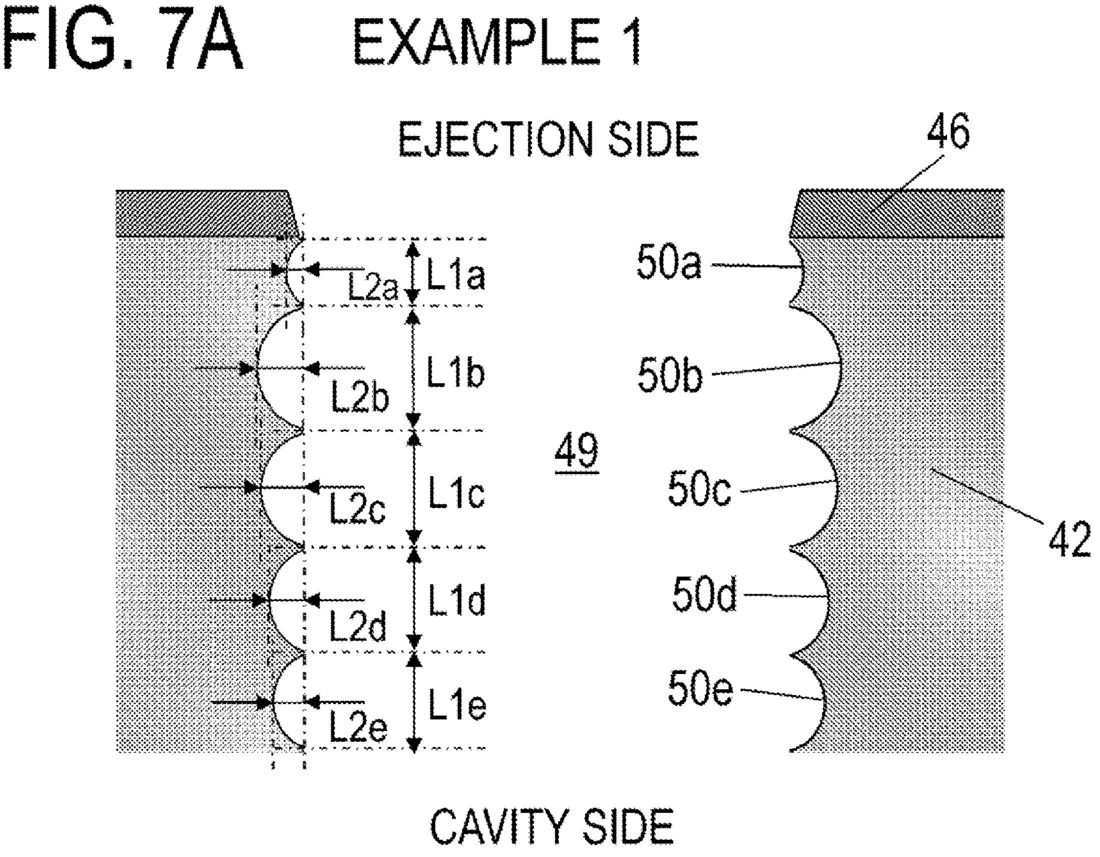
FIG. 7B EXAMPLE 2
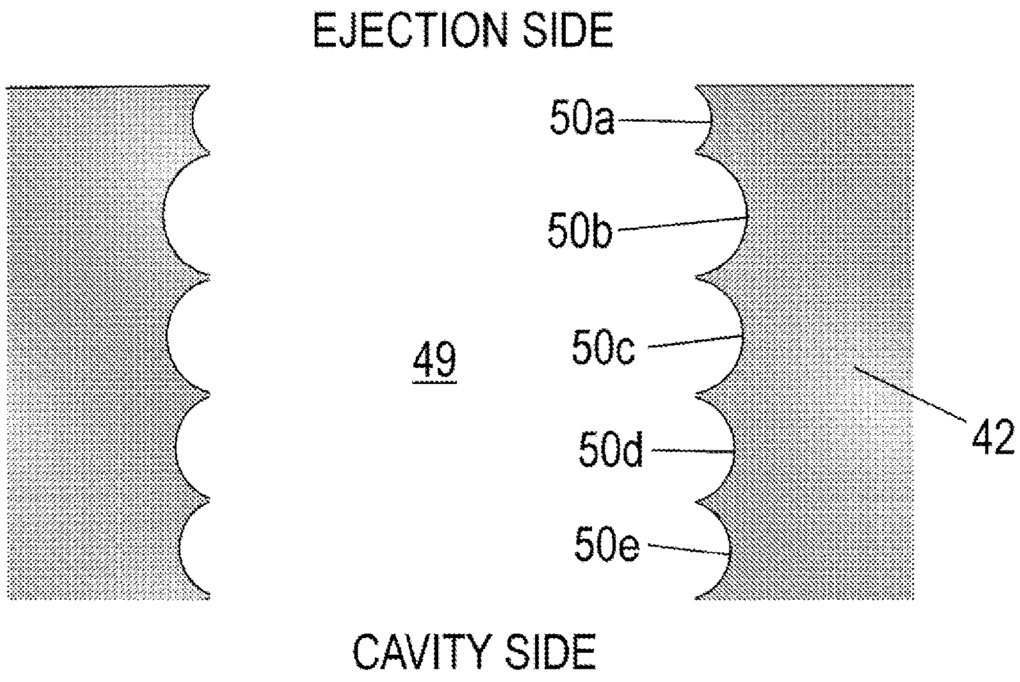

SUBSTRATE FOR LIQUID EJECTION HEAD AND METHOD FOR MANUFACTURING SUBSTRATE FOR LIQUID EJECTION HEAD

BACKGROUND OF THE INVENTION

Field of the Invention

The present invention relates to a substrate for a liquid ejection head and a method for manufacturing a substrate for a liquid ejection head.

Description of the Related Art

As a liquid ejection device provided in a liquid ejection type recording device represented by an ink jet printer, the one disclosed in Japanese Patent Application Publication No. 2013-091272 is known. A liquid ejection device has a structure including an actuator substrate, a nozzle substrate, and the like stacked therein, and includes a liquid passage and a pressure chamber defined and formed between the substrates, an ejection hole formed in the nozzle substrate, a piezoelectric element provided on the actuator substrate, and the like. The piezoelectric element is provided on a movable film forming a part of the wall portion of the pressure chamber. By the energy generated in the pressure chamber by the operation of the piezoelectric element, the liquid (typically, an ink) stored in the pressure chamber is ejected via the ejection hole.

The ejection hole provided on the nozzle substrate may be formed by the Bosch Process in which a silicon substrate is penetrated as disclosed in Japanese Patent Application Publication No. 2021-116309. With the Bosch Process, etching and coating are alternately repeated, and as a result, a roughly perpendicular through hole can be formed while forming a depressed portion (which is referred to as a scallop) at the sidewall. Herein, the Bosch Process has the following feature: when the opening dimension is reduced (to about 100 μm or less), ions or radicals become less likely to enter thereinto with an increase in hole depth; and hence the scallops gradually become smaller. In other words, the following phenomenon is generally known: as the depressed portion of the scallop at the etching initial stage becomes larger, and etching progresses, the depressed portion of the scallop becomes smaller. Particularly, it is known as follows: from the viewpoint of the productivity, when etching is performed at a high rate, the initial scallop becomes larger. It is known as follows: in the case where a general manufacturing method is carried out, when a resist mask is formed on a silicon substrate, and etching is carried out, the tendency as described above is caused.

SUMMARY OF THE INVENTION

The drive signal to be given to the piezoelectric element includes a pull signal (Pull) for expanding the pressure chamber, and a push signal (Push) for shrinking the pressure chamber. When the ejection of a droplet is performed, generally, a Pull-Push-Pull waveform is used. When ejection of a droplet is performed using the waveform, pull-in of the meniscus is performed at the time of Pull according to the kind of the liquid. However, the behavior of the meniscus becomes too large at the ejection hole surface, so that the meniscus becomes unable to be set up at the ejection hole surface. Accordingly, ejection may become unstable at the time of Push. Particularly, in the case where the initial scallop is large as described above, when the angle of the depressed portion of the scallop is large, the meniscus becomes less likely to be formed. Thus, the meniscus falls in the second stage or the third stage of the depressed portion of the scallop. Accordingly, the meniscus may be set up obliquely, so that stable ejection may be unable to be performed.

Further, with such a state of meniscus, not limited to ejection using a piezoelectric element, but also when the heater portion is driven to boil a liquid, thereby ejecting the liquid from the ejection hole, stable ejection may be unable to be performed. This is due to the following: the surface state of the liquid at the instant of ejection becomes unstable, which makes the meniscus vibration at the time of refilling after ejection unstable especially when the depressed portion of the scallop is large.

It is an object of the present invention to provide a technology of enabling stable ejection of a liquid from the ejection hole.

In order to attain the object, a substrate for a liquid ejection head which is a substrate for use in a liquid ejection head of the present invention includes:

- an ejection hole for ejecting a liquid from an inside to an outside of the substrate;
- wherein a plurality of scallops are formed at an inner circumferential surface of the ejection hole, and the plurality of scallops periodically change a diameter of the inner circumferential surface in a penetration direction thereof,
- wherein the plurality of scallops include a first scallop and a second scallop, a width in the penetration direction of the first scallop is narrower than a width in the penetration direction of the second scallop, and the first scallop is on a side closest to the outside, and the second scallop is adjacent to the first scallop on a side closer to the inside, and
- wherein a depth in a radial direction of the ejection hole of the first scallop is shallower than a depth in the radial direction of the ejection hole of the second scallop.

In order to attain the object, a method for manufacturing a substrate for a liquid ejection head of the present invention,

- the substrate for a liquid ejection head being a substrate for use in a liquid ejection head, and having an ejection hole for ejecting a liquid from an inside to an outside of the substrate,
- the method for manufacturing a substrate for a liquid ejection head comprising the steps of:
- forming an etching mask on an oxide film covering a surface of the substrate for opening the ejection hole therein;
- etching the oxide film such that an etching by-product or a depot film is left at a part of the surface for opening the ejection hole therein; and
- an ejection hole forming step of performing reactive ion etching in which etching and coating are alternately repeated on the part of the substrate for opening the ejection hole therein, thereby penetrating the ejection hole.

In accordance with the present invention, stable ejection of a liquid from an ejection hole becomes possible.

Further features of the present invention will become apparent from the following description of exemplary embodiments with reference to the attached drawings.

BRIEF DESCRIPTION OF THE DRAWINGS

FIGS. 3A to 3C are each a schematic view showing the difference in how the meniscus is set up between a conventional example and an example of the present invention;

FIGS. 7A and 7B are cross sectional views of respective liquid ejection holes of Example 1 and Example 2 of the present invention.

DESCRIPTION OF THE EMBODIMENTS

Below, referring to the accompanying drawings, the aspect for executing this invention will be described in detail illustratively based on examples. Incidentally, the dimensions, the materials, the shapes, and the relative arrangement of the constituent components described in the embodiment should be appropriately changed according to the configuration, and various conditions of the device to which the inventio is applied. Further, all the combinations of the features described in the present embodiment are not necessarily essential for the solving means of the present invention. The constituent elements described in the embodiments are strictly illustrative, and it is not intended that the scope of this invention is limited only thereto.

Example 1

A substrate in accordance with an example of the present invention is for use in a liquid ejection head, and the liquid ejection head is a member included in a recording device such as an ink jet printer. The liquid ejection head is configured as an ink jet recording head to be used for ejecting an ink as an image recording liquid to a recording material, and recording a desirable image on the recording material in an ink jet printer. The recording device is additionally provided with an ink tank as a liquid accommodating portion for accommodating a liquid to be supplied to the liquid ejection head, a transportation mechanism of a recording material such as a sheet of an object on which recording is performed, and the like.

Configuration of Substrate for Liquid Ejection Head

Figure 4:
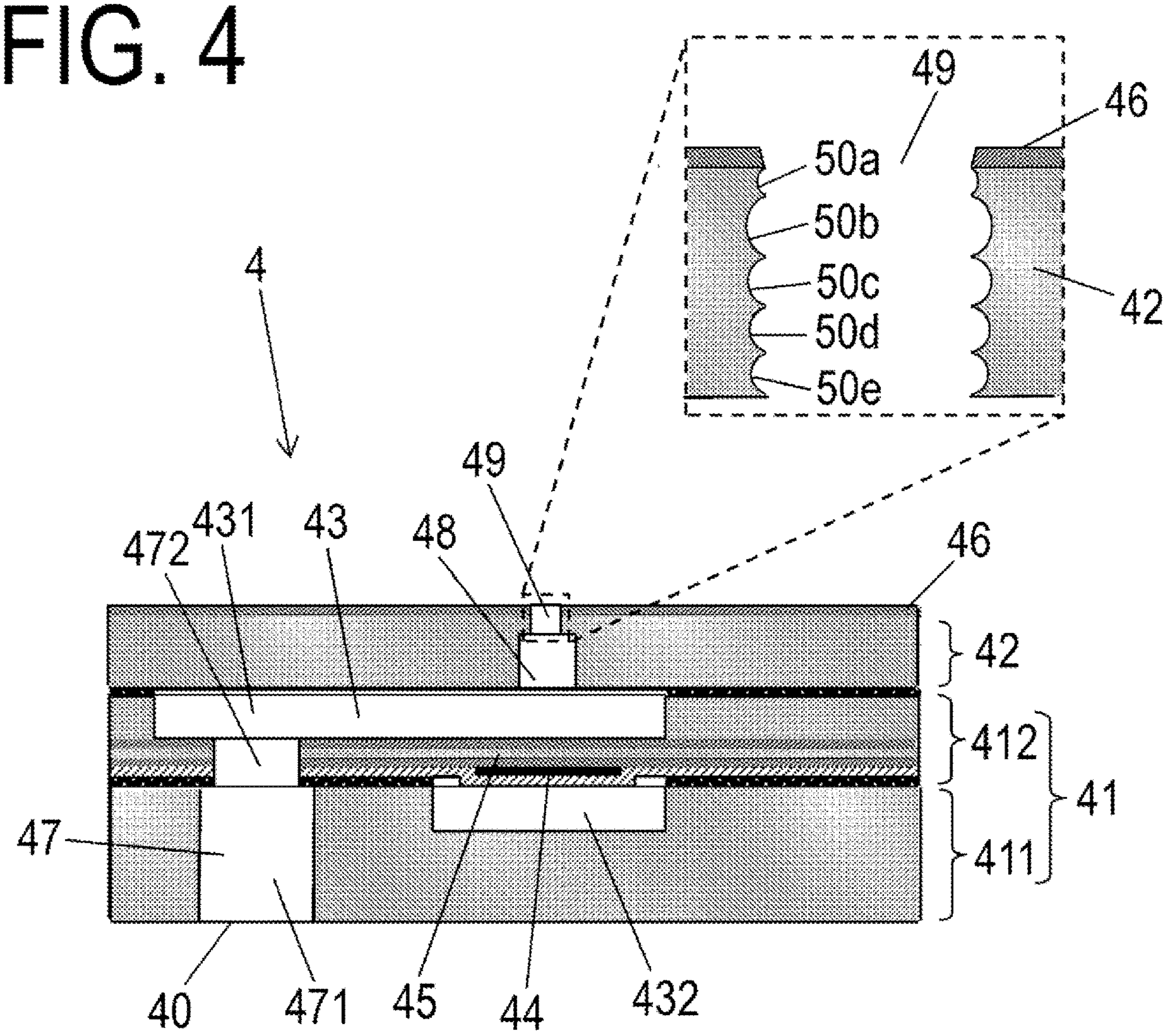
FIG. 4 is a schematic cross sectional view showing a schematic configuration of a substrate for a liquid ejection head of Example 1.

FIG. 4 is a schematic cross sectional view schematically showing a cross sectional configuration of a substrate 4 for a liquid ejection head (below, a substrate 4) in accordance with Example 1 of the present invention. The substrate 4 is a structure including substantially an actuator substrate 41, and a nozzle substrate 42 stacked therein. The actuator substrate 41 is substantially configured such that a first passage substrate 411 and a second passage substrate 412 are stacked therein. Respective substrates are joined with each other via an adhesive layer.

In the substrate 4, a supply port 40 to which an ink is supplied is opened in one surface (first surface), and an ejection hole 49 for ejecting an ink is opened in the other surface on the opposite side (second surface), and an ink passage (liquid passage) establishes a connection between the supply port 40 and the ejection hole 49. The supply port 40 and the ejection hole 49 are at different positions in the surface direction of the substrate 4. The ink passage has a passage configuration in which the supply port 40 and the ejection hole 49 do not overlap each other as seen in the thickness direction of the, substrate 4 (the direction perpendicular to the surface of the substrate 4). The ink passage is configured so as to be communicated with the ejection hole 49 from the supply port 40 through a first passage 47, a second passage 43, and a third passage 48, and to extend bent in the direction perpendicular to and in the direction in parallel with the surface of the substrate 4 inside the substrate 4. Specifically, a through hole 471 and a through hole 472 form the first passage 47 extending perpendicular to the surface of the substrate 4 from the supply port 40. Further, a cavity 431 and a nozzle substrate 42 form the second passage 43 extending (expanding) in parallel with the surface of the substrate 4. Then, there is formed a passage extending perpendicular to the surface of the substrate 4 from the third passage 48 as a liquid ejection passage with a larger diameter than that of the ejection hole 49 to the ejection hole 49 again.

Incidentally, the passage configuration herein shown is strictly one example. For example, such a passage configuration as to include a plurality of passage portions extending in the direction crossing with the thickness direction of the substrate 4 (the direction in parallel with the surface of the substrate 4) is also acceptable. Alternatively, a passage configuration including branch passages extending in such a manner as to branch with respect to a plurality of ejection holes 49, respectively is also acceptable.

The through hole 471 is provided penetrating through the first passage substrate 411 of the actuator substrate 41, and the opening opposite to the side connected with the through hole 472 forms the supply port 40. The through hole 472 is provided at the position overlapping the through hole 471, and in such a manner as to penetrate through the second passage substrate 412 of the actuator substrate 41. The second passage 43 is formed of a cavity 431 of the depressed portion provided at the junction surface with the nozzle substrate 42 of the second passage substrate 412 of the actuator substrate 41, and the nozzle substrate 42 covering the cavity 431. At the bottom of the cavity 431, the through hole 472 is opened. The third passage 48 is the passage formed of the through hole connected with the ejection hole 49, and penetrating through the nozzle substrate 42. The third passage 48 is opened at the part of the nozzle substrate 42 covering the cavity 431 of the second passage substrate 412 (the part forming the second passage 43). The ejection hole 49 is connected with the third passage 48, and extends perpendicular to the surface of the nozzle substrate 42, and is opened at the opposed surface (second surface) to the object of ejection at the substrate 4 (nozzle substrate 42).

The actuator substrate 41 includes a pressure chamber 432, a vibrating film (movable film) 45 forming the partition between the pressure chamber 432 and the cavity 431, and a piezoelectric element 44 provided on the pressure chamber 432 side of the vibrating film 45. The pressure chamber 432 is formed of the depressed portion provided at the junction surface with the second passage substrate 412 of the first passage substrate 411, and the second passage substrate 412 covering the depressed portion. The part of the second passage substrate 412 covering the depressed portion forms the vibrating film 45, and the piezoelectric element 44 is mounted thereon. The third passage 48 of the nozzle substrate 42 is opened at the position opposed to the vibrating film 45 across the cavity 431.

The ink supplied from an ink tank (not shown) passes through the inside of the ink passage from the supply port 40, and receives the energy generated by the piezoelectric element 44, to be ejected from the ejection hole 49. The ink ejected from the ejection hole 49 is deposited on the image recorded surface of the recording material arranged opposed to the ejection hole 49, and forms (records) an image on the recording material.

In the present example, as the energy generating element for use in the actuator portion of the substrate for a liquid ejection head, a substrate configuration using a piezoelectric element will be illustrated. However, a substrate configuration using another pressure generating means such as an electric heat exchange element is also acceptable.

The substrate 4 in accordance with the present Example 1 has a feature in the inner circumferential shape of the ejection hole 49 as indicated by the part of the ejection hole 49 shown on an enlarged scale in FIG. 4. Namely, the inner circumferential surface of the ejection hole 49 formed by the Bosch Process is periodically changed in diameter thereof in the penetration direction, thereby forming such a form that a plurality of depressed portions are arrayed in the penetration direction, namely, a plurality of scallops thereon. The ejection hole 49 in the present example is configured such that the plurality of scallops forming the inner circumferential surface thereof satisfy a prescribed relationship between the depth in the radial direction of the ejection hole 49 and the width in the penetration direction of the ejection hole 49. The details thereof will be described later.

Figure 5A:
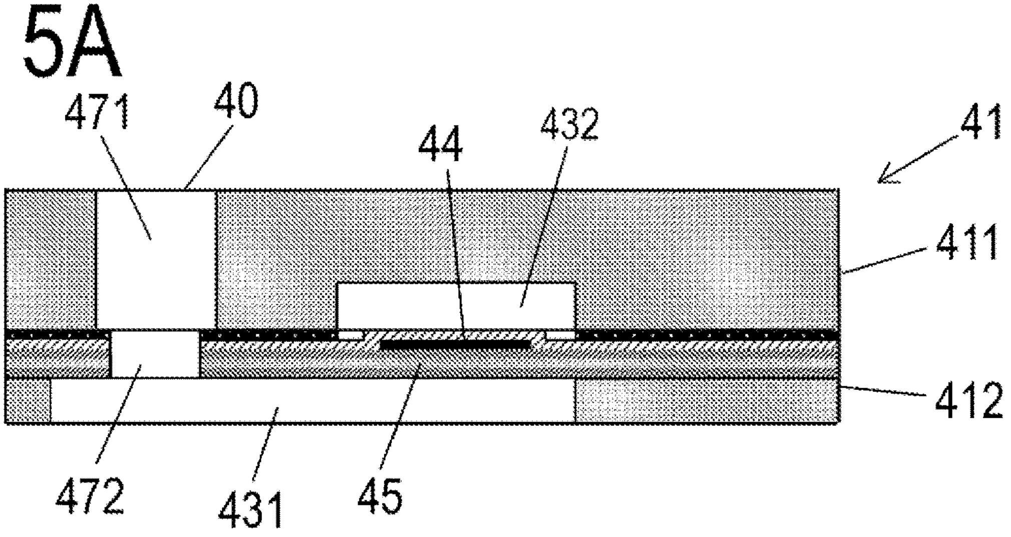
FIGS. 5A to 5C are each an explanatory view of the substrate configuration and the process flow of Example 1 of the present invention.
Figure 5B:
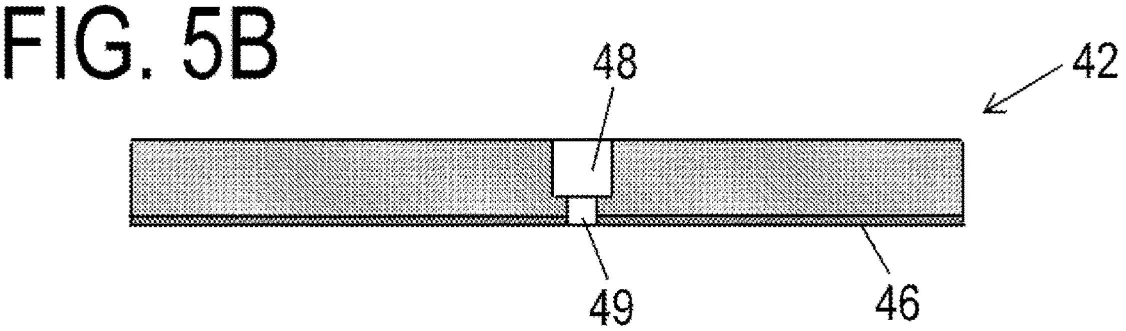
Figure 5C:
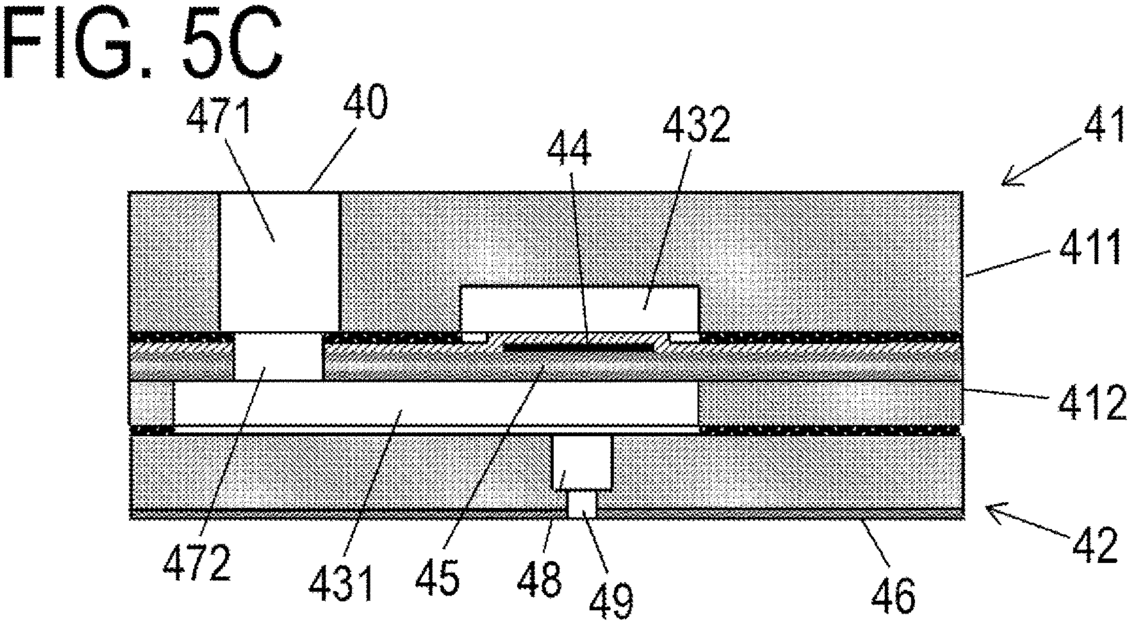

FIGS. 5A to 5C are each a schematic cross sectional view for illustrating the manufacturing process of a substrate for a liquid ejection head in accordance with an embodiment of the present invention. FIG. 5A shows the actuator substrate 41, and FIG. 5B shows the nozzle substrate 42. FIG. 5C shows a state in which the actuator substrate 41 and the nozzle substrate 42 are stacked and joined one on another, so that the substrate 4 for a liquid ejection head in accordance with the present example is assembled.

As shown in FIG. 5A and FIG. 5B, the actuator substrate 41 and the nozzle substrate 42 are separately prepared, respectively, and these are joined with each other, thereby forming the substrate 4. Incidentally, the configuration shown in FIG. 5C is inverted upside down from the configuration shown in FIG. 4.

First, as shown in FIG. 5A, the actuator substrate 41 is prepared. The actuator substrate 41 includes, for example, a silicon substrate, and is partitioned into a cavity 431, a pressure chamber 432, and through holes 471 and 472. At the actuator portion of the actuator substrate 41, in the present example, a piezoelectric element 44 was formed. The actuator substrate 41 supports the vibrating film 45. The vibrating film 45 forms the top wall of the cavity 431, and defines the cavity 431. The piezoelectric element 44 is arranged on the vibrating film 45. In the actuator substrate 41, an interlayer film or a wiring layer is formed so as to drive the actuator portion.

Then, as shown in FIG. 5B, the nozzle substrate 42 is prepared. In the present example, at the nozzle substrate 42, a third passage 48 as a liquid ejection passage is formed by dry etching. Further, in the present example, an oxide film 46 was formed on the surface of the nozzle substrate 42 opposite to the third passage 48.

Then, as shown in FIG. 5C, the actuator substrate 41 and the nozzle substrate 42 are joined with each other. Subsequently, a resist mask 61 is formed on the surface of the oxide film 46, and the ejection hole 49 is formed by dry etching (see FIGS. 6A to 6D, the details thereof will be described later). As a result, the substrate 4 for a liquid ejection head of the present Example 1 is formed.

The nozzle substrate 42 is joined with the back surface of the actuator substrate 41 (the surface on the side of the second passage substrate 412 provided with the cavity 431). The nozzle substrate 42 includes, for example, a SOI substrate including the oxide film 46 and silicon joined with each other therein, and is joined with the back surface of the actuator substrate 41, thereby defining the cavity 431 (second passage 43) together with the actuator substrate 41 and the vibrating film 45. The nozzle substrate 42 has a third passage 48 in such a manner as to overlap the cavity 431. The ejection hole 49 is formed in such a manner as to be connected therewith. The ejection hole 49 penetrates through the nozzle substrate 42, and the opening on the upstream side of the ink passage is opposed to the cavity 431 via the third passage 48. Therefore, when driving of the piezoelectric element 44 causes a change in volume of the cavity 431 (second passage 43), the liquid stored in the cavity 431 passes through the third passage 48, and is ejected from the ejection hole 49.

The piezoelectric element 44 is arranged on the vibrating film 45, and a piezoelectric actuator is configured. The piezoelectric element 44 is formed at the position opposed to the cavity 431 across the vibrating film 45. Namely, the piezoelectric element 44 is formed in such a manner as to be in contact with the surface opposite to the cavity 431 of the vibrating film 45. The vibrating film 45 includes a first electrode film formed on the vibrating film 45, a second electrode film arranged on the first electrode film, and a piezoelectric body layer sandwiched therebetween, and has characteristic of being deformable in the direction opposed to the cavity 431.

Figure 2:
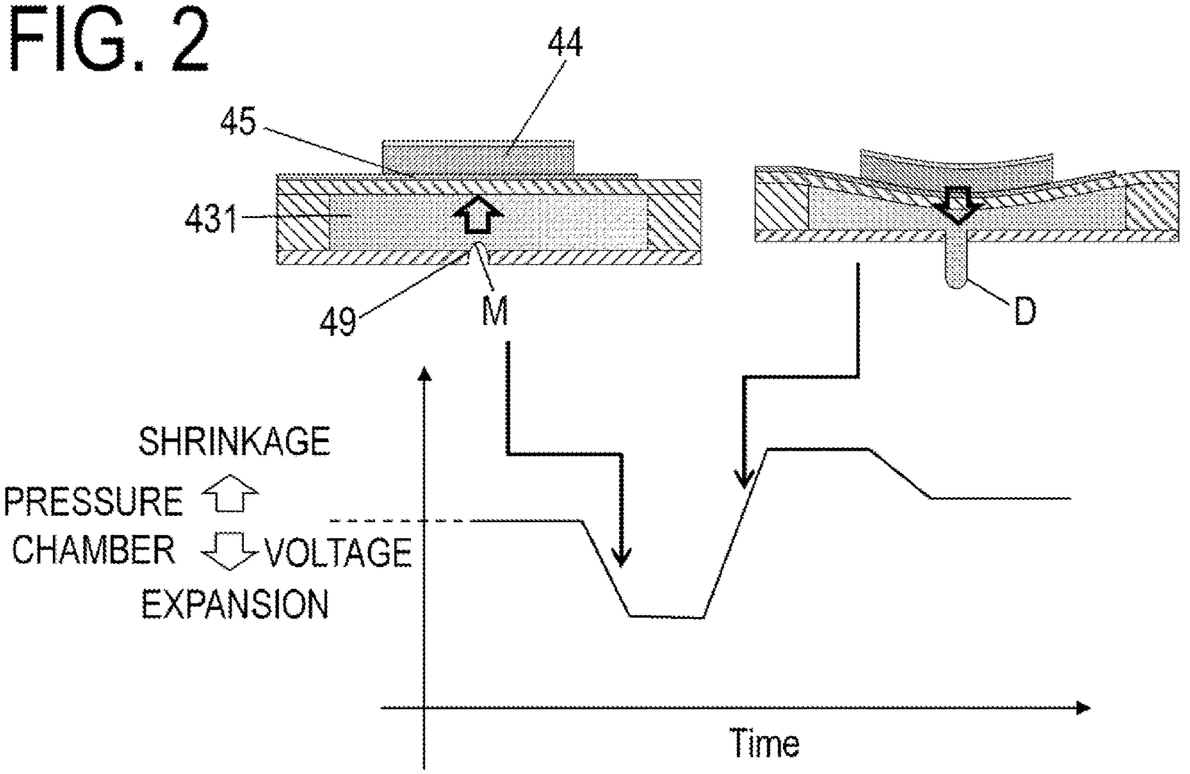
FIG. 2 is an explanatory view of a drive signal to be given to a piezoelectric element.

FIG. 2 is an explanatory view regarding a drive signal (Pull-Push-Pull waveform) to be given to the piezoelectric element. Incidentally, in FIG. 2, the passage configuration of the substrate 4 is shown more simply than in FIG. 4, or the like. When the piezoelectric element 44 is applied with a driving voltage from a driving IC (not shown), the piezoelectric element 44 is deformed due to the inverse piezoelectric effect, which deforms the vibrating film 45. The drive signals to be given to the piezoelectric element 44 include a pull signal (Pull) for expanding the pressure chamber 432, and a push signal (Push) for shrinking the pressure chamber 432 by the deformation of the vibrating film 45. When ejection of a droplet is performed, generally, a Pull-Push-Pull waveform is used. When ejection of a droplet is performed using this waveform, pull-in of the meniscus is performed at the time of Pull according to the kind of the liquid.

Application of a driving voltage of the Pull-Push-Pull waveform results in expansion or shrinkage of the inside of the cavity 431, which causes a change in volume. As a result, the liquid in the cavity 431 is pressurized. Specifically, when the inside of the cavity 431 is expanded, the liquid is pulled in, and a meniscus M is set up on the surface of the ejection hole 49. Subsequently, the liquid pressurized due to shrinkage of the inside of the cavity 431 passes through the third passage 48, and is ejected in a form of a microscopic droplet D from the ejection hole 49.

Configuration of Conventional Ejection Hole

Figure 1:
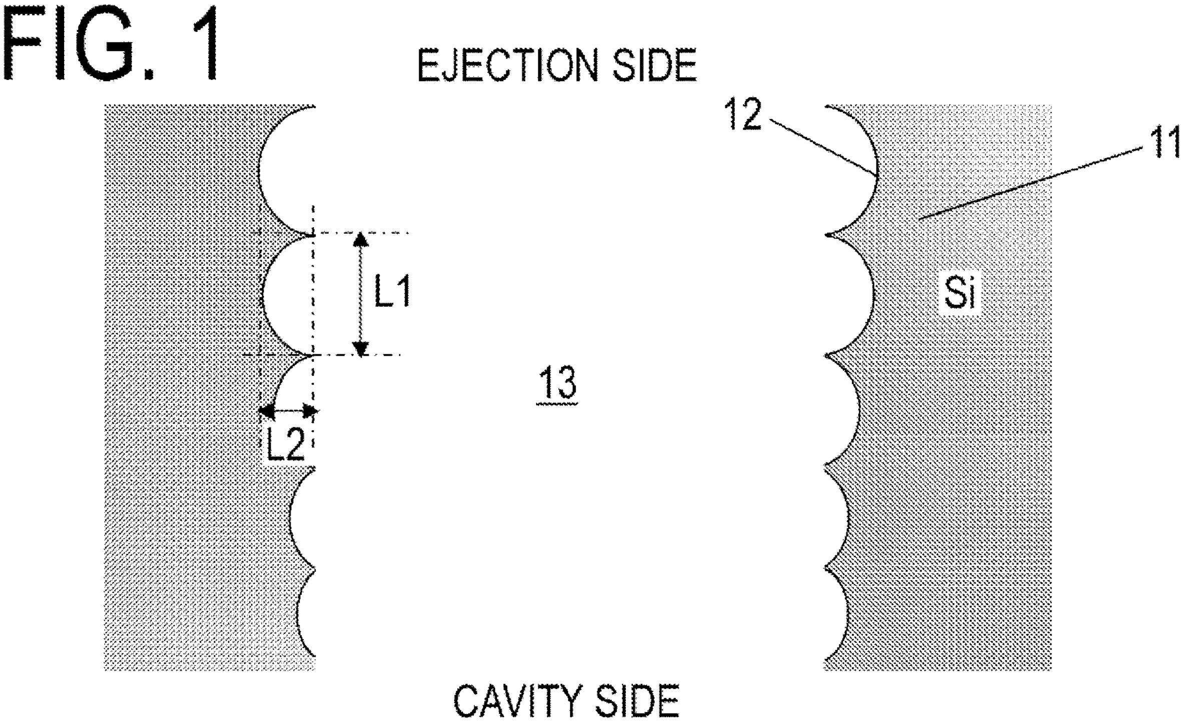
FIG. 1 is a scallop cross sectional view of a general Bosch Process.

FIG. 1 is a schematic cross sectional view showing the configuration of a scallop (depressed portion) 12 forming the inner circumferential surface of the ejection hole 13 when the ejection hole 13 has been formed at the Si substrate 11 formed with a general Bosch Process. With the Bosch Process, the ejection hole 13 is gradually dug and formed by forming the scallops 12 in such a manner as to be repeatedly connected with one another from the ejection side toward the cavity side. Herein, the general Bosch Process has the following feature: as described above, the deeper the hole depth is, the less likely ions or radicals become to enter therein; accordingly, the size of the formed scallop 12 gradually decreases. In other words, the size of the scallop 12 at the initial stage of etching increases, and the size of the scallop 12 decreases as etching progresses.

Herein, it is found as follows: when in droplet ejection, the inside of the cavity is expanded, and a liquid is pulled in, the shape of the scallop on the inner surface of the ejection hole affects the meniscus state, and particularly, the larger the scallop on outermost surface is, the less likely the meniscus is to be formed.

FIG. 3A is a schematic cross sectional view showing the form of the meniscus M formed at the ejection hole 13 of a conventional example. As described above, when pull-in of the meniscus is performed at the time of Pull in signal driving of the piezoelectric element, the behavior of the meniscus at the ejection hole surface becomes too large. Accordingly, the meniscus may be unable to be set up at the ejection hole surface, so that ejection may become unstable at the time of Push. Particularly, as with the ejection hole 13 shown in FIG. 3A, in the case where the scallop 12 on the outermost surface side formed at the initial stage of etching is larger than the scallop 12 on the inner side, when the angle of the scallop 12 is large, the meniscus M becomes less likely to be formed. As a result, the position of the meniscus M becomes unstable, so that the meniscus M drops to the scallop 12 at the second stage or the third stage. This results in a state in which the meniscus M is set up obliquely, so that ejection may become unstable.

Configuration of Ejection Hole of Example of the Present Invention

FIG. 7A is a schematic cross sectional view schematically showing the cross sectional configuration of the ejection hole 49 in Example 1 of the present invention. FIG. 7B is a schematic cross sectional view schematically showing the cross sectional configuration of the ejection hole 49 of Example 2 of the present invention. As shown in FIG. 7A and FIG. 7B, the inner circumferential surface of the ejection hole 49 in the present example is configured in a form in which a plurality of scallops (the depressed portion-shaped portions of the ejection hole 49 indented in a concave shape in the radial direction) are arrayed in the penetration direction of the ejection hole 49, and the diameter thereof periodically changes in the penetration direction of the ejection hole 49. Then, a first scallop 50*a* situated closest to the ejection side (the outermost side of the substrate 4) of the plurality of scallops is formed smaller than a second scallop 50*b* adjacent to the first scallop 50*a* on the cavity side (the inward side of the substrate 4).

One scallop can be defined as the region between the two small-diameter peak positions arranged across one large-diameter peak position in the penetration direction in the inner circumferential surface shape in which diameter expansion and diameter shrinkage are repeated in the penetration direction of the ejection hole 49. Then, the distance between the two small-diameter peak positions in the penetration direction of the ejection hole 49 can be defined as the width L1 of one scallop. Further, assuming the diameter expansion peak position as the deepest position in one scallop, the difference between the deepest position and the small-diameter peak positions interposing it therebetween can be defined as the depth L2 of the scallop. Incidentally, the cross sections of the ejection hole 49 shown in FIG. 1, FIGS. 3A to 3C, FIG. 4, FIGS. 6A to 6D, and FIGS. 7A and 7B each are the cross section including the central axis of the ejection hole 49.

The ejection hole 49 in the present example is configured such that the width L1*a* of the first scallop 50*a* is narrower than the width L1*b* of the second scallop 50*b*, and such that the depth L2*a* of the first scallop 50*a* is shallower than the depth L2*b* of the second scallop 50*b*. Such a configuration results in that the shape stability of the meniscus of the first scallop 50*a* are relatively made higher than that of the second scallop 50*b*. As a result, the formation position of the meniscus is stabilized at the first scallop 50*a*.

Further, the ejection hole 49 in the present example is configured such that the first scallop 50*a* is smaller than the scallops 50*c* to 50*e* as third scallops present closer to the inside of the substrate 4 than the second scallop 50*b*. Namely, the width L1*a* of the first scallop 50*a* is narrower than the widths L1*c* to L1*e* of the third scallops 50*c* to 50*e*, and the depth L2*a* of the first scallop 50*a* is shallower than the depths L2*c* to L2*e* of the third scallops 50*c* to 50*e*. Such a configuration results in that the shape stability of the meniscus of the first scallop 50*a* is relatively made higher in the entire ejection hole 49.

Further, the ejection hole 49 in the present example is configured such that the ratio (L1/L2) of the width L1*a* to the depth L2*a* in the first scallop 50*a* satisfies $L1/L2 \geq 4$. Such a configuration can further enhance the shape stability of the meniscus. As disclosed in Japanese Patent Application Publication No. 2021-116309, by satisfying the condition of $L1/L2 \geq 4$, it is possible to reduce the ink remainder particularly in ejection of an aqueous ink. In addition, it is possible to reduce the occurrence of poor ejection due to drying of the ink at the step.

Further, the ejection hole 49 in the present example is configured such that the ratio of the width L1 to the depth L2 of the scallops 50*b* to 50*e* except for the first scallop 50*a* of the plurality of scallops forming the inner circumferential surface satisfies $L1/L2 < 4$. Such a configuration can relatively enhance the shape stability of the meniscus in the first scallop 50*a* in the entire ejection hole 49.

FIG. 3B is a schematic cross sectional view showing the form of the meniscus M formed at the ejection hole 49 of the Example 1 of the present invention. FIG. 3C is a schematic cross sectional view showing the form of the meniscus M formed at the ejection hole 49 of Example 2 of the present invention. As shown in FIG. 3B and FIG. 3C, in accordance with the present example, the position of the meniscus M is stabilized, and ejection of a droplet is stabilized.

Formation Flow of Ejection Hole of Example of the Present Invention

FIGS. 6A to 6D each show the detailed formation flow of the ejection hole 49 of Example 1 of the present invention.

Figure 6A:
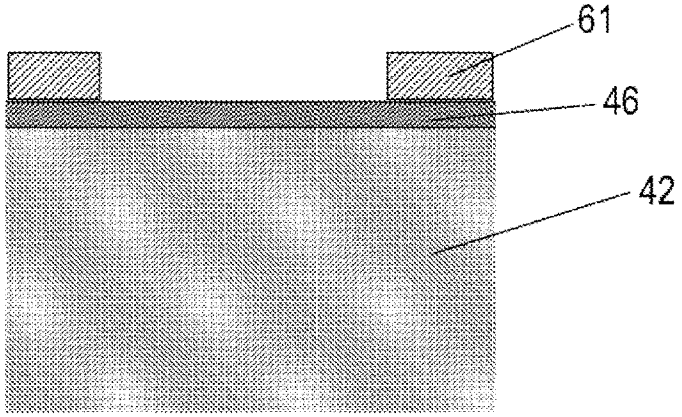
FIGS. 6A to 6D are each an ejection hole forming flow of Example 1 of the present invention.

First, as shown in FIG. 6A, a resist mask 61 for opening an ejection hole (liquid ejection hole) 49 is formed at the surface of the oxide film 46 by photolithography (etching mask forming step).

Figure 6B:
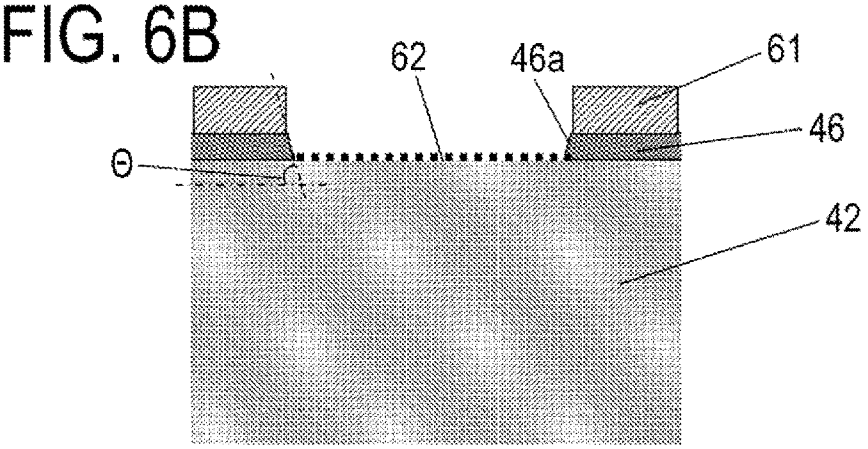

Then, as shown in FIG. 6B, the oxide film 46 is removed by dry etching (oxide film removing step). The oxide film 46 is formed with a film thickness of from 0.2 μm to 2.0 μm, and preferably from 0.5 μm to 1.0 μm. As the method for etching the oxide film 46, and forming the opening, reactive ion etching can be used, and is preferable. As the gas for use in etching, for example, a mixed gas of $C_4F_8$ gas, a $CF_4$ gas, and an Ar gas can be used, and reactive ion etching using an ICP (inductively coupled plasma) device can be carried out.

However, it is acceptable to use a reactive ion etching device having a plasma source of other systems. For example, an ECR (electron cyclotron resonance) device, or a NLD (magnetic Neutral Loop Discharge) plasma device can be used.

As one example of the conditions for oxide film etching, for example, the gas pressure is controlled within 0.1 Pa to 5.0 Pa; the gas flow rate, within the range of 10 sccm to 1000 sccm; the coil power, within the range of 1000 W to 2000 W; and the platen power, within the range of 300 W to 500 W. Preferably, the flow rate of a $C_4F_8$ gas is set within the range of 30 sccm to 100 sccm, which facilitates generation of the etching by-product and a depot film 62 at the opening bottom.

Further, when the oxide film 46 is etched under the foregoing etching conditions, an inclined surface 46*a* inclined with respect to the surface of the substrate 4 at an angle θ of the opening end portion of the oxide film 46 (the peripheral edge portion surrounding the opening of the ejection hole 49) can be formed. The inclined surface 46*a* is an inclined circumferential surface surrounding the opening of the ejection hole 49, and is a tapered surface expanding in diameter with away outwardly of the substrate with respect to the surface of the nozzle substrate 42 of the substrate 4 covered with the oxide film 46. By forming such an inclined surface 46*a*, it is possible to facilitate the formation of the meniscus of a liquid at the opening edge of the ejection hole 49. The angle θ formed between the inclined surface 46*a* of the end of the oxide film 46 and the surface of the substrate 4 (nozzle substrate 42) is preferably set at at least 75° but less than 90°.

In Example 1 of the present invention, the oxide film 46 was removed by reactive ion etching. As the gas for use in etching, a mixed gas of a $C_4F_8$ gas, a $CF_4$ gas, and an Ar gas was used. As the conditions for oxide film etching, the gas pressure was controlled at 0.3 Pa; the gas flow rate, at 500 sccm; the coil power, at 1500 W; and the platen power, at 400 W. The angle θ formed between the inclined surface 46*a* at the opening end portion of the oxide film 46 and the surface of the substrate 4 was about 80°.

Figure 6C:
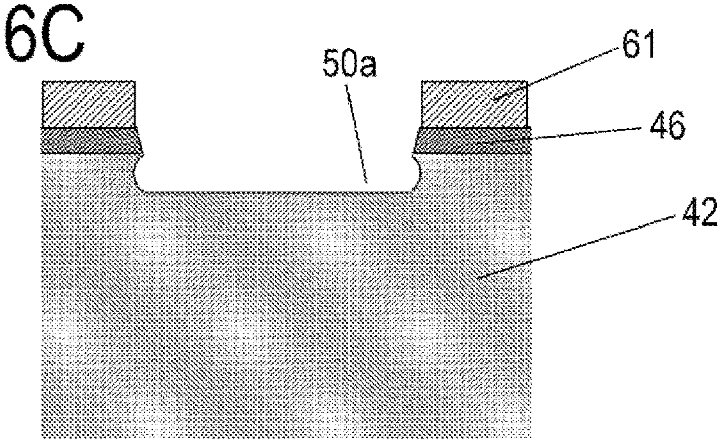

Then, as shown in FIG. 6C, the ejection hole 49 is penetrated by reactive ion etching in which etching and coating are alternately repeated (ejection hole forming step). With the etching by-product and the depot film 62 formed at the opening bottom after oxide film etching being present, Si dry etching was carried out with the Bosch Process. As a result, as shown in FIG. 6C, after removing the etching by-product and the depot film 62 at the time of initial Si etching, Si is etched. For this reason, the first scallop 63 at the outermost surface was formed with a smaller width L1 and a smaller depth L2 than the width L1 and the depth L2 of the subsequent scallop. By doing so, it was possible to form the inner circumferential surface shape of the ejection hole 49 in the shape making the meniscus at the time of liquid pull-in at the time of Pull less likely to be broken, which could attain stable ejection. In other words, even when etching is performed under etching condition of high rate of high productivity as the Si etching conditions, it became possible to form a liquid ejection hole in the shape making meniscus with small width and depth of the first scallop more likely to be set up.

As the silicon etching conditions, with the Bosch Process, a $SF_6$ gas was used as the etching gas, and a $C_4F_8$ gas was used as the coating gas. For both the etching step and the coating step, preferably, the gas pressure is controlled within the range of 0.1 Pa to 50 Pa, and the gas flow rate is controlled within the range of 50 sccm to 1000 sccm. In the present example, for both the etching step and the coating step, the gas pressure was controlled at 10 Pa, and the gas flow rate was controlled at 500 sccm. Then, by controlling the time of the etching step within the range of 5 seconds to 20 seconds, and the time of the coating step between 1 second to 10 seconds, it is possible to form a passage with high perpendicularity. When a high rate is more preferably set, by setting the gas pressure to as high as 10 Pa or more, the gas flow rate as large as 500 sccm or more, and the time of the etching step as long as 5 seconds or more, the rate becomes faster. In the present example, the time of the etching step was controlled at 10 seconds, and the time of the coating step was controlled at 5 seconds.

Figure 6D:
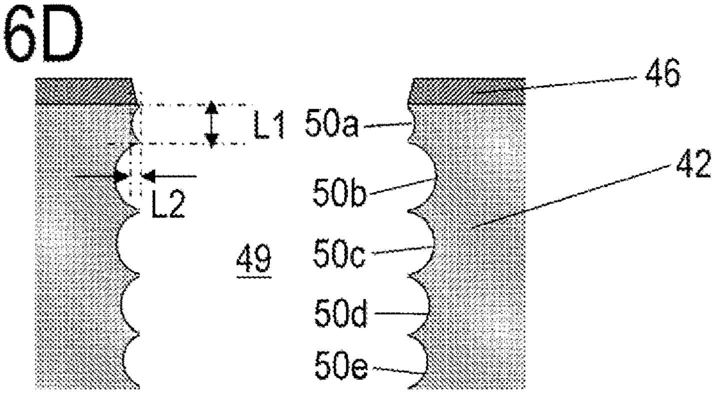

By the process up to this point, as shown in FIG. 6D, the ejection hole 49 penetrating through the nozzle substrate 42 is formed. The scallop shape shaped at the ejection hole 49 by silicon etching is configured such that the relationship between the width L1 and the depth L2 of the unevenness of the scallop 50*a* at the outermost surface is larger than that of L1/L2 of the unevenness of the scallop 50*b* thereunder.

Herein, as the value of L1/L2, more preferably, the L1/L2 of the unevenness of the scallop 50*a* at the outermost surface satisfies L1/L2≥4, and the L1/L2 of the unevenness of the scallops 50*b* to 50*e* below the outermost surface satisfies L1/L2<4. The larger L1/L2 is, the larger the width of the scallop, and the smaller the depth is. For this reason, the unevenness is going to be close to being flat, which is advantageous for setting up the meniscus.

In the present example, the unevenness of the scallop 50*a* at the outermost surface satisfied L1/L2=4.3, and the scallops 50*b* to 50*e* thereunder or lower satisfied L1/L2<4. Incidentally, the number and the shape of the scallops 50 formed shown in each drawing are strictly illustrative, and are not limited to the configuration shown in each drawing.

With the substrate 4 for a liquid ejection head in accordance with the present example obtained through the steps up to this point, the meniscus behavior at the ejection hole 49 is stabilized, which can attain stable ejection.

Example 2

A description will be given to a substrate for a liquid ejection head in accordance with Example 2 of the present invention. Herein, the different points in Example 2 from Example 1 will be mainly described.

As shown in FIGS. 3C and 7B, the substrate for a liquid ejection head in accordance with Example 2 of the present invention is configured such that in the substrate for a liquid ejection head, the substrate surface in which the ejection hole is opened to the outside is not covered with an oxide film as with the substrate for a liquid ejection head of Example 1. The manufacturing steps are the same as those of Example 1 up to penetration of the ejection hole 49 by the Bosch Process. In Example 2, after forming the ejection hole 49 in the same step as that of Example 1, a step of removing the oxide film at the substrate surface is added.

Thus, even without the oxide film at the substrate surface, the scallop 50*a* at the outermost surface is formed with smaller width L1*a* and depth L2*a* than the widths and the depths of other scallops 50*b* to 50*e*. Therefore, as with the substrate of Example 1, the shape making the meniscus at the time of liquid pull-in for Pull less likely to be broken could be achieved, and stable ejection could be attained.

With the substrate for a liquid ejection head of Example 2, the contact angle of the liquid at the ejection hole can be configured different with respect to the substrate for a liquid ejection head of Example 1. Namely, with respect to the ink as an ejection liquid, for the substrate of Example 1 covered with the oxide film 46, the contact angle is low at the oxide film 46, and for the surface of the nozzle substrate 42 made of silicon, the contact angle becomes high. The necessary contact angle may vary according to the kind of the ejection liquid. Selective formation of the oxide film 46 enables coping with this.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-056368, filed on Mar. 30, 2022, which is hereby incorporated by reference herein in its entirety.

What is claimed is:

1. A substrate for a liquid ejection head, comprising:

an ejection hole for ejecting a liquid from an inside to an outside of the substrate;

wherein a plurality of scallops are formed at an inner circumferential surface of the ejection hole, and the plurality of scallops periodically change a diameter of the inner circumferential surface in a penetration direction thereof, wherein the plurality of scallops include a first scallop and a second scallop, a width in the penetration direction of the first scallop is narrower than a width in the penetration direction of the second scallop, and the first scallop is on a side closest to the outside, and the second scallop is adjacent to the first scallop on a side closer to the inside, and wherein a depth in a radial direction of the ejection hole of the first scallop is shallower than a depth in the radial direction of the ejection hole of the second scallop.

2. The substrate according to claim 1, wherein the width of the first scallop is narrower than a width in the penetration direction of a third scallop, and the third scallop is on a side closer to the inside than the second scallop, and wherein the depth of the first scallop is shallower than a depth in the radial direction of the ejection hole of the third scallop.

3. The substrate according to claim 2, wherein the third scallop comprises a plurality of third scallops, arranged in the penetration direction, and the third scallops decrease in width and depth with approach toward the inside.

4. The substrate according to claim 1, wherein, where L1 represents the width and L2 represents the depth, a ratio (L1/L2) of the width to the depth in the first scallop satisfies L1/L2≥4, and wherein the ratio of scallops except for the first scallop among the plurality of the scallops satisfies L1/L2<4.

5. The substrate according to claim 1, which is a structure including a plurality of substrates including a nozzle substrate including the ejection hole penetrating therethrough, stacked therein, wherein the nozzle substrate includes silicon, and wherein an oxide film is coated on a surface of the nozzle substrate in which an opening on a side closer to the outside of the ejection hole is opened.

6. The substrate according to claim 5, wherein a peripheral edge portion of the oxide film surrounding the opening of the ejection hole has an inclined circumferential surface expanding in diameter with approach toward a side of the outside.

7. The substrate according to claim 6, wherein the inclined circumferential surface has an angle with respect to a surface of the nozzle substrate of at least 75° but less than 90°.

8. The substrate according to claim 1, comprising:

a liquid passage communicating with the ejection hole;

a vibrating film configuring a part of a partition forming the liquid passage;

a pressure chamber divided from the liquid passage by the vibrating film; and a piezoelectric element provided at the vibrating film, wherein the piezoelectric element is deformed, thereby changing a volume of the liquid passage, resulting in generation of a pressure for ejecting a liquid from the ejection hole.

* * * * *